United States Patent
Higgins

[19]

[11] Patent Number: 5,953,350
[45] Date of Patent: Sep. 14, 1999

[54] MULTIMEDIA CLIENT FOR MULTIMEDIA/HYBRID NETWORK

[75] Inventor: Ronald D. Higgins, The Colony, Tex.

[73] Assignee: Selsius Systems, Inc., Dallas, Tex.

[21] Appl. No.: 08/404,191

[22] Filed: Mar. 13, 1995

[51] Int. Cl.[6] ............................................. H04J 3/02
[52] U.S. Cl. ................................. 370/524; 370/401
[58] Field of Search .......................... 370/60, 60.1, 61, 370/94.1, 94.2, 94.3, 110.1, 85.13, 82, 95.1, 84, 68.1; 379/95, 96, 158; 340/825.02; 348/15, 16, 388

[56] References Cited

U.S. PATENT DOCUMENTS

| | | | |
|---|---|---|---|
| 4,228,536 | 10/1980 | Gueldenpfennig et al. | 370/66 |
| 4,256,926 | 3/1981 | Pitroda et al. | 179/18 |
| 4,322,843 | 3/1982 | Beuscher et al. | 370/63 |
| 4,442,321 | 4/1984 | Stehman | 179/18 EB |
| 4,475,156 | 10/1984 | Federico et al. | 364/300 |
| 4,567,589 | 1/1986 | Lecomte et al. | 370/58 |
| 4,672,662 | 6/1987 | Nishino et al. | 379/277 |
| 4,713,806 | 12/1987 | Oberlander et al. | 370/58 |
| 4,821,265 | 4/1989 | Albal et al. | 370/110.1 |
| 4,835,769 | 5/1989 | Donaghue, Jr. et al. | 370/85 |
| 5,001,702 | 3/1991 | Teraslinna et al. | 370/94.1 |
| 5,029,164 | 7/1991 | Goldstein et al. | 370/95.1 |
| 5,164,938 | 11/1992 | Jurkevich et al. | 370/60 |
| 5,168,515 | 12/1992 | Gechter et al. | 379/265 |
| 5,179,556 | 1/1993 | Turner | 370/94.1 |
| 5,195,086 | 3/1993 | Baumgartner et al. | 370/62 |
| 5,231,631 | 7/1993 | Buhrke et al. | 370/94.1 |
| 5,241,580 | 8/1993 | Babson, III | 379/15 |
| 5,243,163 | 9/1993 | Sattar et al. | 379/88 |
| 5,265,092 | 11/1993 | Soloway et al. | 370/395 |
| 5,276,681 | 1/1994 | Tobagi et al. | 370/85.4 |
| 5,280,483 | 1/1994 | Kamoi et al. | 370/94.1 |
| 5,289,462 | 2/1994 | Ahmadi et al. | 370/60.1 |
| 5,307,347 | 4/1994 | Duault et al. | 370/110.1 |
| 5,313,454 | 5/1994 | Bustini et al. | 370/13 |
| 5,339,332 | 8/1994 | Kammerl | 375/10 |
| 5,345,443 | 9/1994 | D'Ambrogio et al. | 370/60 |
| 5,381,413 | 1/1995 | Tobagi et al. | 370/85.6 |
| 5,392,223 | 2/1995 | Caci | 364/514 |
| 5,436,898 | 7/1995 | Boxen et al. | 370/389 |
| 5,473,680 | 12/1995 | Dortes | 370/62 |
| 5,493,568 | 2/1996 | Sampat et al. | 370/60 |
| 5,506,954 | 4/1996 | Arshi et al. | 395/162 |
| 5,530,695 | 6/1996 | Dighe et al. | 370/17 |
| 5,574,724 | 11/1996 | Bales et al. | 370/68.1 |
| 5,594,732 | 1/1997 | Bell et al. | 370/401 |
| 5,659,542 | 8/1997 | Bell et al. | 370/522 |

FOREIGN PATENT DOCUMENTS

| | | | |
|---|---|---|---|
| 0 529 864 A1 | 3/1993 | European Pat. Off. | G06F 15/16 |
| 0 639 016 A2 | 2/1995 | European Pat. Off. | H04L 29/00 |

OTHER PUBLICATIONS

Publication by IEEE MultiMedia entitled "Multimedia Systems: An Overview:" by Borko Furht: Florida Atlantic University: 1994: pp. 47–59.

Publication by IEEE Journal "Flexible and Robust Packet Transport for Digital HDTV" by Robert J. Siracusa. Joseph Kuriacose. Joel Zdepski and Dipankar Raychaudhuri: 1993: pp. 88–98.

Publication by Communications of the ACM entitled "Client–Server Computing" by Alok Sinha: Jul. 1992: pp. 77–98.

*Primary Examiner*—Dang Ton
*Attorney, Agent, or Firm*—Baker & Botts, L.L.P.

[57] ABSTRACT

A system and method for allowing remote control of an isochronous device. The system comprises: (1) first and second isochronous devices, (2) a packet-based signalling channel coupling the first and second isochronous devices and allowing communication of signalling messages between the first and second isochronous devices, the first isochronous device capable of initiating a request to the second isochronous device to transfer multimedia information from the second isochronous device to the first isochronous device and (3) an isochronous user information path established by the second isochronous device in response to initiation of the request, the isochronous user information path coupling the first and second isochronous devices for transfer of the multimedia information, the first isochronous device thereby effecting remote control of the second isochronous device. The present invention further introduces a system for adapting a data stream received into a computer from an isochronous user information path for use by a video file viewing application, such as an MPEG video viewer.

24 Claims, 7 Drawing Sheets

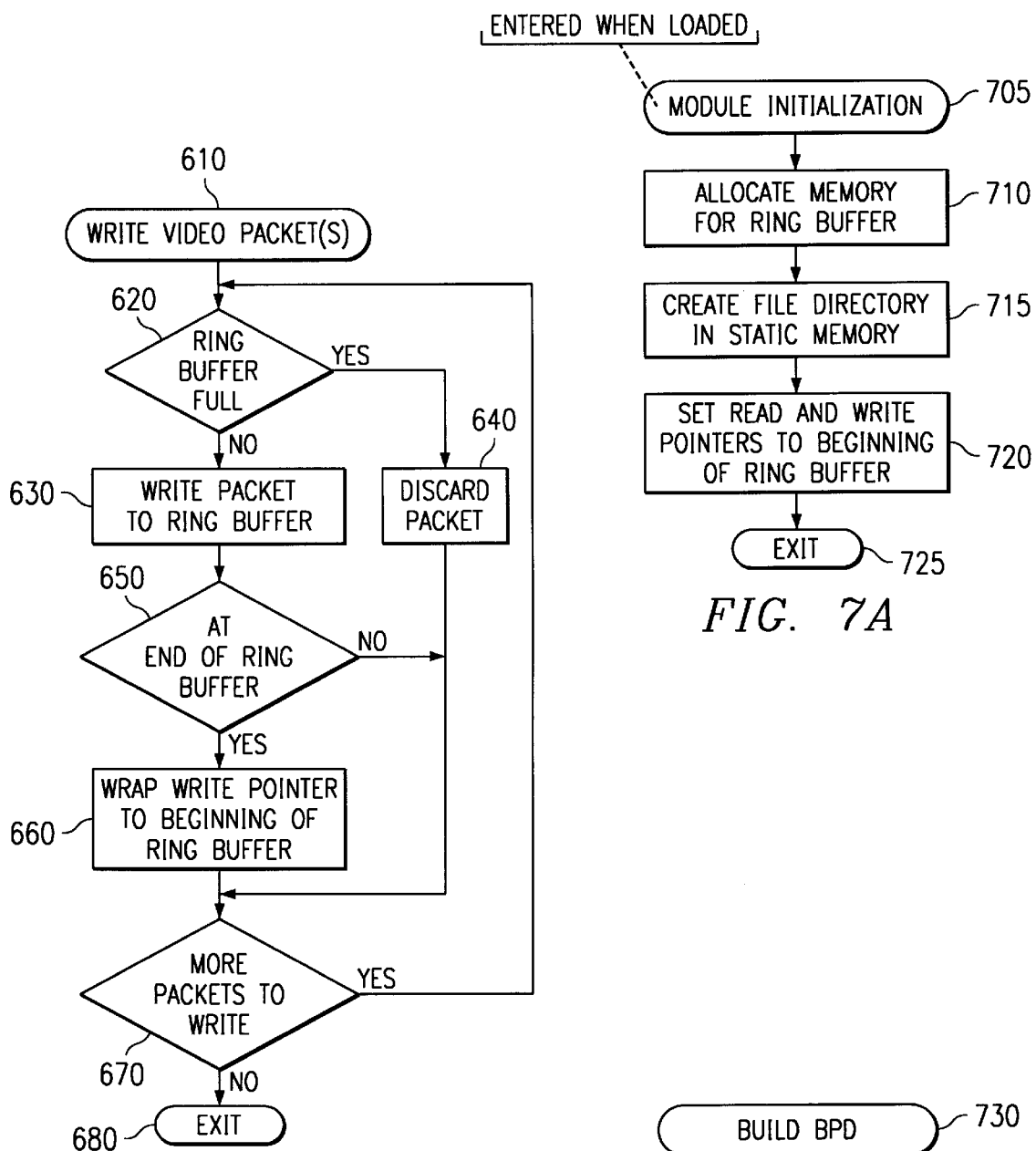

MULTIMEDIA CLIENT FOR MULTIMEDIA/HYBRID NETWORK

CROSS-REFERENCE TO RELATED PATENTS

| U.S. Pat. No. | Title | Inventor(s) | Filing Date |
|---|---|---|---|
| 5,594,732 | BRIDGING AND OUT-OF-BAND SIGNALLING SUBSYSTEMS AND METHODS FOR A MULTIMEDIA SYSTEM | Robert T. Bell, et al. | March 3, 1995 |
| 5,659,542 | SYSTEM AND METHOD FOR SIGNALLING AND CALL PROCESSING FOR PRIVATE AND HYBRID COMMUNICATIONS SYSTEMS INCLUDING MULTIMEDIA SYSTEMS | Robert T. Bell, et al. | March 3, 1995 |
| 5,838,683 | DISTRIBUTED INTERACTIVE MULTIMEDIA SYSTEM ARCHITECTURE | Paul S. Hahn, et al. | March 13, 1995 |

The above-listed applications are commonly assigned with the present invention and are incorporated herein by reference as if reproduced herein in their entirety.

TECHNICAL FIELD OF THE INVENTION

The present invention is directed, in general, to communications systems and, more particularly, to a multimedia system allowing flexible communications between remote isochronous devices and multicasting of isochronous video and audio streams.

BACKGROUND OF THE INVENTION

Currently, "information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data." To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Defining the structure and operation of an interactive multimedia system is a critical first step in the development of such system. Accordingly, before entering into a discussion herein of more specific design issues, it is important to discuss more general questions that need to be resolved concerning design objectives of the system as a whole and some generally agreed-upon answers and specifications.

Interactive multimedia may be thought of as an electronic approximation of the paradigm of interactive group discussion. It involves the interactive exchange of voice, video and data between two or more people through an electronic medium in real time. Because of its interactive and real-time nature, there are some stringent requirements and required services not normally associated with multimedia retrieval systems. Some of the more obvious examples of those requirements and services include latency (transmission delay), conferencing, availability ("up-time") and WAN interoperability.

The evolution of existing private branch exchange ("PBX") and LAN topologies towards a composite interactive multimedia system based upon client/server architectures and isochronous networks is a natural trend. However, to merge the disparate mediums of voice, video and data successfully into a cohesive network requires that three fundamental integration issues be defined and resolved. The first of the fundamental integration issues is quality of service ("QoS"). QoS is defined as the effective communication bandwidth, services and media quality coupling of separate equipment or "terminals" together and the availability ("up-time") of the same. QoS parameters are divided into four groups: 1) terminal QoS, 2) network QoS, 3) system QoS, and 4) availability requirements. Thus, QoS parameters must be defined for both terminal equipment ("TE") and network equipment ("NE") governing the communication of data between the TE. System QoS is derived from a combination of terminal and network QoS. The suggested values for QoS parameters are considered to be a practical compromise between required service quality, technology and cost. See, Multimedia Communications Forum ("MMCF") Working Document "Architecture and Network QoS", ARCH/QOS/94-001, Rev. 1.7, MMCF, (September 1994) and ITU-T Recommendation I.350 "General Aspects of Quality of Service and Network Performance in Digital Networks, including Integrated Services Digital Networks ("ISDNs"), (1993). The following Table I summarizes some suggested parameters for terminal QoS.

TABLE I

Terminal QoS Parameters

| Parameter Type | Parameter Value | Parameter Explanation |
|---|---|---|
| Audio Frequency Range | 3.4 kHz | Optimization is for voice, and is consistent with existing Legacy voice systems. |
| Audio Level | −10 dBmO | Optimization is for voice, and is consistent with Legacy voice systems. |
| Audio Encoding | G.711 (8-bit pulse code modulation ("PCM")) | Consistent with Legacy voice systems. |
| Video Resolution | ≧352 × 288 (SIF) | Minimal acceptable size for video conferencing. |
| Video Frame Rate | ≧20 frames per second (fps) | Minimal optimization for detection of facial expression transitions. |
| Voice/Video Intramedia- | <100 milliseconds (ms) | A differential delay greater than 100 ms between voice |

TABLE I-continued

Terminal QoS Parameters

| Parameter Type | Parameter Value | Parameter Explanation |
|---|---|---|
| Intermedia Differential Delay | | & video is noticeably significant. |
| Video Encoding | H.261 & Motion Picture Experts Group ("MPEG")-1 | H.261 meets WAN interoperability, MPEG-1 is more consistent with desktop trends and quality requirements. |
| Intramedia Latency (TE) | <100 ms | The delay of the TE itself for encoding and framing purposes. |
| User Data Rate | ≧64 kbps | Minimal acceptable data bandwidth for data sharing applications. Consistent with ISDN Basic Rate Instrument ("BRI"). |
| Data Encoding | High-level Data Link Control ("HDLC") encapsulation | Consistent with isochronous service bearer channels. |

Network QoS parameter requirements consist of those parts of the system that are between two TE endpoints. This includes a portion of the TE itself, the private network (if required), and the public network (if required). Some of the requirements imposed upon the network QoS are a result of the terminal QoS parameters. The following Table II summarizes the network QoS requirements.

TABLE II

Network QoS Parameters

| Parameter Type | Parameter Value | Parameter Explanation |
|---|---|---|
| Intramedia Latency (NE) | <50 ms | Intramedia latency is the delay between source TE transmission and destination TE reception; i.e. the delay of NE. |
| Network Capacity | ≧1,536 kbps | G.711 Audio (64 kbps), MPEG-1 Video (1,344 kbps), HDLC data (128 kbps). |

The system QoS encompasses the terminal and network elements. The particular value critical to the system is the intramedia latency. The following Table III summarizes this value that is the sum of the terminal and network values for the same parameter.

TABLE III

System QoS Parameters

| Parameter Type | Parameter Value | Parameter Explanation |
|---|---|---|
| Intramedia Latency (System) | <150 ms | Intramedia latency is the delay between source transmission and destination reception. It includes latency imposed by the source and destination TEs as well as the NE. These latency values might include encoding and decoding delays, transmission delays, and adaptation delays. |

The system QoS parameter of Intramedia Latency is the sum of twice the TE and the NE latency. Intramedia Latency parameter value is bounded by voice requirements since latent delay is more readily perceived by the ear than the eye. However, the delay itself is typically a function of video since it is the component requiring the most time for encoding and decoding.

Availability ("up-time") includes several aspects. In particular, the network elements have very strict requirements. These requirements are typical of private branch exchanges ("PBXs") and other private network voice equipment, but are very atypical of Legacy LANs. Most LANs are susceptible to power-losses, single points of failure, and errant TE. An interactive multimedia system must closely follow the availability requirements of the legacy voice systems. The following Table IV summarizes Availability QoS parameters.

TABLE IV

Availability QoS Parameters

| Parameter Type | Parameter Value | Parameter Explanation |
|---|---|---|
| TE Power Requirements | 5 watts (W) of phantom power (48 volts (V)) | This power requirement is consistent with the ISDN BRI requirements and will allow the least common denominator of voice to function. |
| NE Power Requirements | Uninterruptable power supply ("UPS") | NE must be UPS capable including private NE. |
| Single point of failure | 12 Users | No more than 12 users should be impacted by a single point of failure. |
| Error Free Seconds Ratio ("EFS") | >99.9% | Meets requirement of random bit error rate of $10^{-6}$. |

The availability requirements are defined solely within the context of the private network. Additional availability parameters are discussed in G.821. See also, MMCF Working Document "Architecture and Network QOS", ARCH/QOS/94-001, Rev. 1.7, Multimedia Communications Forum, Inc., (September 1994) and TR-TSY-000499, Transport Systems Generic Requirements (TSGR) : Common Requirements, Bellcore Technical Reference, Issue 3, (December 1989).

The second of the fundamental integration issues is network services. Network services include transport services, connection management and feature management. Multimedia communication involves the transmission of data having more varied characteristics than video, voice or data in isolation. Therefore, the manner in which the network transports and manages the flow of video, voice and data is critical to the efficiency, flexibility and overall effectiveness of the network.

Transport services can be categorized into three groups: 1) packet, 2) circuit and 3) cell. The following Table V summarizes different aspects of each of these transport services.

TABLE V

Transport Services

| | Packet | Circuit | Cell |
|---|---|---|---|
| Typical technology | Ethernet ®, Token Ring ®, Frame Relay ®, etc. | ISDN, T1 | Asynchronous Transfer Mode ("ATM") |
| Media optimization | Packet data | Isochronous data (voice, video) | Packet & isochronous data |

TABLE V-continued

Transport Services

| | Packet | Circuit | Cell |
|---|---|---|---|
| Transport optimization | Multicast, shared medium operations | Point-point, full-duplex, low-cost switching | Point-point, full-duplex, high-speed switching |
| Optimized data size | 1500 bytes (Ethernet ®) | 1 byte (voice) | 48 bytes |
| Transport Overhead | 4.2% (64 bytes - IP) | none | 11.3% (6 bytes - AAL1) |
| Transport Methodology | Shared | Switched | Switched |
| Route Methodology | Routing | Signalling (circuit switching) | Signalling (virtual circuit switching) |
| Typical Deployment | Widespread. Deployed as LAN | Widespread. Deployed as both public network and private NE | Very few installations. Typically deployed as private backbone network |

Interactive multimedia requires the usage of an isochronous network because of the QoS requirements for voice and video. While it is possible to construct a packet network with sufficient bandwidth, buffering and intelligence to accommodate synchronous traffic it is considered to be prohibitively expensive and unnecessary. Nevertheless, both the LAN, PBX and WAN require interoperability.

At some point it is expected that the entire private network infrastructure will employ ATM. This will transpire upon the occurrence of several events. First, WANs must adapt to support ATM Points-of-Presence ("POPs"). Second, the telephone must disappear from the premise (replaced by an ATM audio device). Third, packet-based LAN TE must become ATM TE. Fourth, phantom power must be supported to the ATM TE (for availability purposes). Fifth, an 8 kHz synchronous clock must be supported and managed by all ATM equipment. Finally, the price of ATM TE and NE must approach that of Ethernet®, ISDN and isoEthernet® equipment.

Regardless of the interim private network infrastructure, ATM is the only backbone solution for the private network. It is the only scalable switching architecture that can transport packet and isochronous data. Furthermore, because it is deployed as a backbone, the aforementioned issues do not apply.

Connection management is the process employed by the private and public network routing functions. Because packet routing is a well established and defined process, it is not discussed further. Connection management within the confines of an isochronous network for interactive multimedia is a newer technology (albeit with old roots) and deserves discussion.

Signalling for circuit and cell switching is best defined by the ISDN signalling standards (see, TR-NWT-000938, Network Transmission Interface and Performance Specification Supporting Integrated Digital Services Network (ISDN), Bellcore Technical Reference, Issue 1, (August 1990)), isoEthernet® signalling (see, IEEE Proposed Standard 802.9a, "Isochronous services with Carrier Sense Multiple Access with Collision Detection (CSMA/CD) Media Access Control (MAC) service", (December 1994)) and ATM signalling (see, ATM Forum, "ATM User-Network Interface Specification—Version 3.0", (September 1993) and ITU-T Recommendation Q.293x, "Generic Concepts for the Support of Multipoint and Multiconnection Calls"; (1993)). Historically, isochronous networks carry the signalling channel as an isochronous channel. Nevertheless, the signalling function can be shown to be better suited to a packet channel. A hub/routing function is the ideal location to perform the bridging between an isochronous signalling channel and a packet signalling channel. The natural packet protocol choice for a signalling channel is an Internet Protocol ("IETF IP"). Available on most LAN networks, as well as global routing capability, IP greatly enhances the signalling requirement of interactive multimedia.

Feature management consists of the management of those features provided by the private and public network for interactivity purposes. The PBX is followed as a model for interactive multimedia features. The following Table VI summarizes some of the more common features.

TABLE VI

Feature Management

| System Services | User Services | Maintenance |
|---|---|---|
| Account Codes | Buzz Station | Automatic Restart |
| Authorization Codes | Callback | Connection Detail Recording |
| Automatic Number Identification | Call Forward | Default Installation |
| Direct Inward Dialing ("DID") | Call Park | Class of Service |
| Direct Outward Dialing ("DOD") | Call Pickup | Hot Configuration |
| Hunt Groups | Call Waiting | |
| Multimedia on hold | Do Not Disturb/Override | |
| Network Numbering Plan | Hold/Consultation Hold | |
| Number Dial Plan | Last Number Redial | |
| Shared Resource Queuing | Multiple/Shared Call Appearances | |
| System Speed Dialing | Conference (multiparty) | |
| Vacant Number Intercept | Transfer | |

The third of the fundamental integration issues is interoperability. An interactive multimedia system by nature implies interoperability, because a multimedia network as envisioned is too large and far-flung to employ the equipment of only a single supplier. Therefore, standards must be established that allow equipment from different suppliers to interact smoothly. To this end, interoperability must extend to transport mechanisms, signalling and compression standards.

There are certain existing communication technologies that must be supported and others that are used. A truly interoperable interactive multimedia system should guarantee that the physical and logical interfaces of each component adheres to a standard. Prior to 1992, this would have been almost impossible. The present day affords the opportunity to evolve the proprietary telephony of the PBX and the proprietary video of the video conferencing systems into standards-based systems in the same manner that the data systems evolved from proprietary mainframes to the standards-based LAN systems of today. The following Table VII summarizes the required standards of interoperability.

TABLE VII

Interoperability Standards

| Transport Standards | Signalling Standards | Compression Standards |
|---|---|---|
| isoEthernet® (IEEE 802.9a) | ISDN NI-2 | G.711, G.722 (Audio) |
| ATM | QSIG | H.221 (Video) |
| ISDN | Q.2931 | MPEG-1 (Video) |
| | H.320 (Audiovisual) | |

In addition to the standards required for communications, there are other specifications relating to application programming interfaces for terminal and server control. These include Microsoft® Telephony Application Programming Interface ("TAPI®"), Novell® Telephony Service Application Programming Interface ("TSAPI®") and Microsoft® Open DataBase Connectivity ("ODBC®").

Having now set the stage with a discussion of general issues concerning multimedia systems, more specific design issues may now be discussed. The specific design issue of concern is functionality at the desktop to implement an interactive multimedia system.

The evolution of work at the desktop has been an on-going process since the inception of personal computers ("PCs") in the 1980s. Today, multimedia PCs integrate voice, video and data at the desktop. When multimedia PCs are coupled together over a LAN, remote stations can communicate with one another. These capabilities reveal a momentous advance from the stand-alone PC-based word processors of the past.

The communication capabilities of multimedia PCs include in the simplest form, a file transfer with accompanying message to a remote locale on the LAN. A more sophisticated example encompasses a video conferencing session between two stations on the LAN. The real-time cooperation of voice and video over a LAN, such as a LAN using an Ethernet® packet-based network, is not a trivial task. However, technological advances include full integration of voice, video and data over a computer-based network.

As a global isochronous network becomes more of a reality, desktop functionality takes on a new meaning. A global isochronous network is envisioned to network all types of different communication devices each potentially incorporating different communication technologies. The global network may include a multimedia PC with integral telephone and video equipment over a LAN attempting to communicate to a telephone directed through a central switch to the public telephone network. While ISDN currently provides for user-to-user signalling between isochronous devices, such signalling has been strictly limited to sending text messages between the devices, as no procedures exist for actually allowing one device to control another remotely. Presently, therefore, a client isochronous device within a LAN has no procedure available for controlling another isochronous client's behavior in another network configuration.

True functionality at the desktop includes a multitude of tasks including, but not limited to, a cooperative procedure to exchange capabilities between devices in order to export control from a controlled client to a controlling client, and a design that abstracts an isochronous data stream (from a B channel isoEthernet® interface) to a logical block device and file that may be accessed by a desktop application. Truly interactive multimedia is without impact until the functionality necessary to implement global communication reaches the desktop.

Accordingly, what is needed in the art is a desktop interactive multimedia computer that affords a user control over remote isochronous devices to receive audio, and particularly video, from remote sources over isochronous data channels.

SUMMARY OF THE INVENTION

To address the above-discussed deficiencies of the prior art, it is a primary object of the present invention to provide multimedia services to an interactive multimedia computer system.

In the attainment of the above-described primary object, one aspect of the present invention provides a system for allowing remote control of an isochronous device, comprising: (1) first and second isochronous devices, (2) a packet-based signalling channel coupling the first and second isochronous devices and allowing communication of signalling messages between the first and second isochronous devices, the first isochronous device capable of initiating a request to the second isochronous device to transfer multimedia information from the second isochronous device to the first isochronous device and (3) an isochronous user information path established by the second isochronous device in response to initiation of the request, the isochronous user information path coupling the first and second isochronous devices for transfer of the multimedia information, the first isochronous device thereby effecting remote control of the second isochronous device.

Thus, the present invention allows one isochronous device to control another in a remote location. The two devices are thus able to establish the isochronous user information path therebetween to share data. The isochronous nature of the user information path guarantees channel characteristics that are not always possible with channels over packet networks, thereby advantageously allowing, for instance, communication of 30 fps video between the devices.

In a preferred embodiment of this aspect of the present invention, the second isochronous device transmits a capabilities message to the first isochronous device prior to initiation of the request, the capabilities message communicating a media capability of the second isochronous device. Therefore, the first device can learn of the capabilities or configuration of the second device, allowing the first device to determine whether it should request transmission of data over the isochronous channel from the second device.

In a preferred embodiment of this aspect of the present invention, the signalling channel is established over a public network. As herein described, the present invention can make advantageous use of the data handling capability of the public network to provide signalling transport, allowing partitioning of a private network into remote sites.

In a preferred embodiment of this aspect of the present invention, the signalling messages are transmitted in packets between first and second private network partitions associated with the first and second isochronous devices, respectively, the packets including information uniquely identifying the first and second isochronous devices. As further herein described, the multimedia network within which the isochronous devices of the present invention preferably operates is capable of encapsulating the signalling messages for transmission over a packet network linking the first and second private network partitions.

In a preferred embodiment of this aspect of the present invention, the multimedia information is selected from the group consisting of: (1) video and (2) audio.

In a preferred embodiment of this aspect of the present invention, the first and second isochronous devices are adapted to communicate data selected from the group consisting of: (1) voice, (2) video and (3) data.

In a preferred embodiment of this aspect of the present invention, the first isochronous device is an interactive multimedia desktop computer.

In a preferred embodiment of this aspect of the present invention, the second isochronous device is selected from the group consisting of: (1) an interactive multimedia desktop computer, (2) a BRI set and (3) a POTS. Thus, the first device can control a number of remote isochronous devices to establish communication therewith over the isochronous user information path.

In a preferred embodiment of this aspect of the present invention, the multimedia information is selected from the group consisting of: (1) MPEG encoded audio and/or video and (2) H.320 encoded audio and/or video.

In a preferred embodiment of this aspect of the present invention, the first and second isochronous devices comprise Integrated Services Terminal Equipment ("ISTE"). Those of ordinary skill in the art are familiar with the definition and capabilities of ISTE. Such ISTE functions as subordinate devices in a communications network and may comprise desktop computers having interactive multimedia capability.

In the attainment of the above-described primary object, another aspect of the present invention provides, in a computer having an operating system, a video file viewing application executing within the operating system and circuitry coupling the computer to an isochronous user information path, a system for adapting a data stream received into the circuitry from the isochronous user information path for use by the video file viewing application. The system comprises: (1) a buffer, under control of a buffer input manager, the buffer capable of receiving and storing portions of the data stream from the isochronous information path via the buffer input manager and (2) a file emulator capable of extracting the portions of the data stream from the buffer and presenting the portions as though having been retrieved from a file compatible with the operating system, the file emulator thereby enabling the video file viewing application to retrieve the portions from the file emulator and display the portions on an output device associated with the computer.

Thus, the present invention introduces a way in which a data stream flowing over an isochronous channel can be seized, buffered and provided to a conventional video file viewing application, such as an MPEG viewer, as though the data stream was being retrieved from a storage unit, such as a hard disk drive. Because the isochronous channel can be made to appear as a data file, the file viewing application can remain conventional. The present invention therefore allows multicasting of video and/or audio data over the isochronous channel to a number of recipient computers.

In a preferred embodiment of this aspect of the present invention, the data stream is a real time data stream selected from the group consisting of: (1) audio data and (2) video data.

In a preferred embodiment of this aspect of the present invention, the isochronous user information path is carried on one or more ISDN B channels or isoEthernet® C channels. Those of ordinary skill in the art will understand that the present invention is equally applicable in the environment of isoEthernet®, wherein C channels are employed as bearer channels. Both ISDN B and isoEthernet® C channels are 64 kbps (non-restricted) or 56 kbps (restricted) channels.

In a preferred embodiment of this aspect of the present invention, the circuitry coupling the computer system to the isochronous user information path comprises an isochronous ISDN B channel driver. Such drivers are known in the art, but as yet unemployed in the conversion of B channel data streams into virtual files.

In a preferred embodiment of this aspect of the present invention, the system further comprises an ISDN B channel driver interface coupling the circuitry and the buffer input manager. The B channel driver interface prepares the B channel data for transmission to the buffer input manager.

In a preferred embodiment of this aspect of the present invention, the buffer is a ring buffer. Those of ordinary skill in the art are familiar with ring buffers, their construction and use. The present invention preferably maintains a ring buffer to compensate for minor temporary variations in data insertion and extraction rates.

In a preferred embodiment of this aspect of the present invention, the file emulator comprises a virtual device driver. Those of ordinary skill in the art are familiar with the concept of virtual device drivers, as such are widely used. However, the present invention employs a virtual device driver that emulates a file accessible by the operating system.

In a preferred embodiment of this aspect of the present invention, the system further comprises a logical device enabling the video file viewing application to retrieve the portions from the file emulator. Those of ordinary skill in the art are also familiar with logical devices and their interaction with operating systems. The present invention employs the logical device as a virtual storage unit or drive, providing an interface between the operating system and the file-emulating virtual device driver.

In a preferred embodiment of this aspect of the present invention, the operating system is selected from the group consisting of: (1) Microsoft® Windows® overlaying Microsoft® MS-DOS and (2) Microsoft® Windows® NT. Those of ordinary skill in the art are aware, however, that the present invention is also applicable in environments outside of IBM-compatible PCs, such as Apple Macintoshes, wherein System 7 is a representative operating system.

In a preferred embodiment of this aspect of the present invention, the computer is a PC. Again, the computer may be any data processing and storage device having display capability, as the present invention may be modified to operate in any environment.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates a flow diagram of a buffer input manager that forms a further portion of the software-based system of FIG. 4;

DETAILED DESCRIPTION

Figure 1:
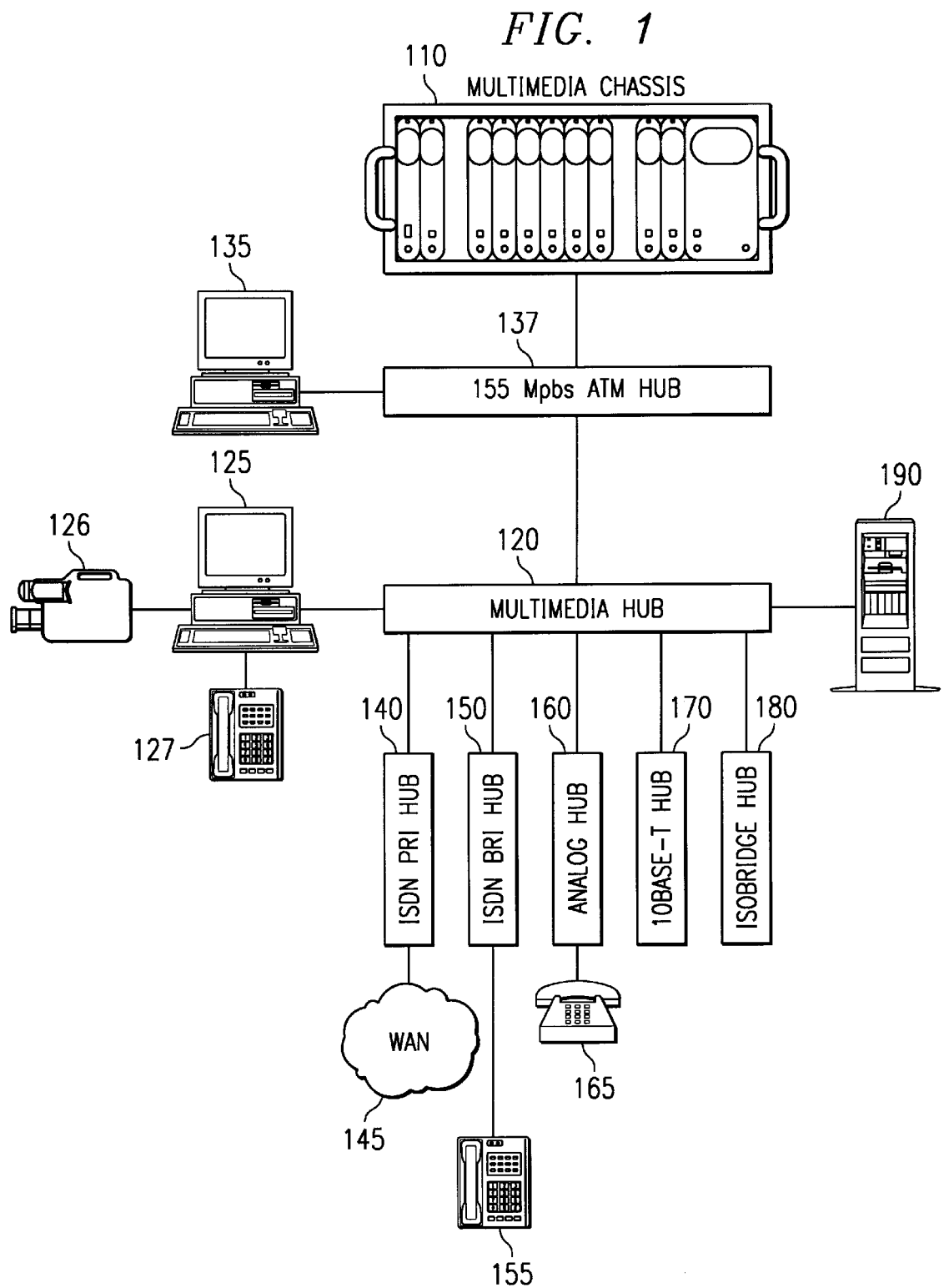
FIG. 1 illustrates a system diagram of an interactive multimedia system including an interactive multimedia desktop computer according to the present invention.

Referring initially to FIG. 1, illustrated is a system diagram of an interactive multimedia system employing the signalling subsystem of the present invention.

The system, generally designated 100, may comprise a multimedia chassis 110 adapted to receive a plurality of cards therein. The system 100 may alternatively or additionally comprise a plurality of hubs in separate chasses. In the latter case, each of the hubs would contain one of the cards otherwise located in the multimedia chassis 110. Because the hubs are separate from each other, the following discussion will be directed to hubs as opposed to cards in the multimedia chassis 110, although it should be understood that the hubs can as easily exist as cards within the multimedia chassis 110.

A multimedia hub 120 forms a principal component of the system 100. In the illustrated embodiment, the multimedia hub 120 contains the following functions: 10Base-T hub repeater, B channel switch, isoEthernet® interfaces (allowing a subordinate device such as a multimedia PC 125, including an associated video camera 126 and telephone instrument 127, to be coupled thereto), encapsulated D channel over IP bridge, encapsulated IP over D channel bridge, tone plant, digital signal processing ("DSP") functions (such as a conference bridge, tone detection, call progress detection, multimedia record/playback and a music interface) and a System Network Management Protocol ("SNMP") agent. Thus, it is readily apparent that most of the system 100 functions involving translation or bridging among standards is handled in the multimedia hub 120.

An ATM hub 137 provides bridging between the multimedia chassis 110 and/or one or more multimedia hubs 120. This allows the system 100 to interface with an ATM backbone. The ATM hub 137 preferably contains 16 155 Mbps OC-3c ATM interfaces. Thus, the ATM hub 137 can be connected to as many as 16 multimedia hubs 120 or non-multimedia PCs 135. The ATM hub 137 may interface to an ATM backbone (not shown) via a higher rate OC-x ATM hub 137.

An ISDN Primary Rate Instrument ("PRI") hub 140 provides a bridge to a WAN 145 through multiple ISDN T1 or E1 Primary Rate interfaces. The ISDN PRI hub 140 contains two isoEthernet® interfaces. This provides redundant connections between the ISDN PRI hub 140 and the multimedia hub 120.

An ISDN BRI hub 150 provides a bridge for ISDN BRI telephone instruments and interfaces 155. A workstation (not shown) may therefore control its telephone via Ethernet®. The ISDN BRI hub 150 is capable of associating the workstation with its corresponding telephone since the ISDN BRI hub 150 has access to both Ethernet® and D channel signalling. The ISDN BRI hub 150 appears as the network end to the ISDN BRI instruments and interfaces 155 and supports NI-2 compatible BRI instruments only.

The ISDN BRI hub 150 contains between 12 and 24 BRI interfaces. As with the ISDN PRI hub 140, the ISDN BRI hub 150 contains two isoEthernet® interfaces. This provides redundant connections between the ISDN BRI hub 150 and the multimedia hub 120.

An analog telephony hub 160 provides connectivity for Plain Old Telephone Sets ("POTS") 165. The analog telephony hub contains coder/decoders ("CODECs") and DSP functionality. Consequently, the POTS 165 appear to the system 100 as BRI sets. Furthermore, a workstation (not shown) may control its POTS 165 via Ethernet®. The analog telephony hub 160 is capable of associating the workstation with its corresponding telephone since the analog telephony hub 160 has access to both Ethernet® and D channel signalling. The analog telephony hub 160 contains 12–24 analog ports. Again, as with the ISDN PRI hub 140 and the ISDN BRI hub 150, the analog telephony hub 160 contains two isoEthernet® interfaces. This provides redundant connections between the analog telephony hub 160 and the multimedia hub 120.

A 10Base-T hub 170 provides 24 SNMP-managed 10 Base-T ports. The 10 Base-T hub 170 further provides an Ethernet® AU interface and a single 10Base-F network interface.

An isoBridge hub 180 provides a bridging function between an isochronous network and a packet network. The isoBridge hub 180 is typically used in work-at-home applications wherein an end station is communicating via a fax/modem through an isochronous WAN into a packet-based Ethernet®. The isoBridge hub 180 performs the conversion of fax/modem data and HDLC data to and from Ethernet® packets. The isoBridge hub 180 contains no station interface but does contain two isoEthernet® network interfaces.

A server or multimedia manager 190 is coupled to the multimedia hub 120. The server performs a variety of connection management, feature management and system management functions. The server is preferably comprised of server software executing on widely-available server platforms, such as Intel, MIPS and Digital Equipment Corporation (DEC) Alpha servers. The operating system of choice is Microsoft® Windows® NT Server, adapted to execute on the above-listed servers.

Given this flexible platform, the server 190 is capable of the following features: preemptive multitasking, symmetric multiprocessing ("SMP"), security, executing virtual device drivers, multiple packet network stacks (such as TCP/IP and IPX), reliability (redundant array of inexpensive disks ("RAID"), for instance), multiple languages and SNMP management. The server 190 further contains a management function, effected in the illustrated embodiment by Hewlett-Packard's OpenView® and an object-oriented database.

Figure 2:
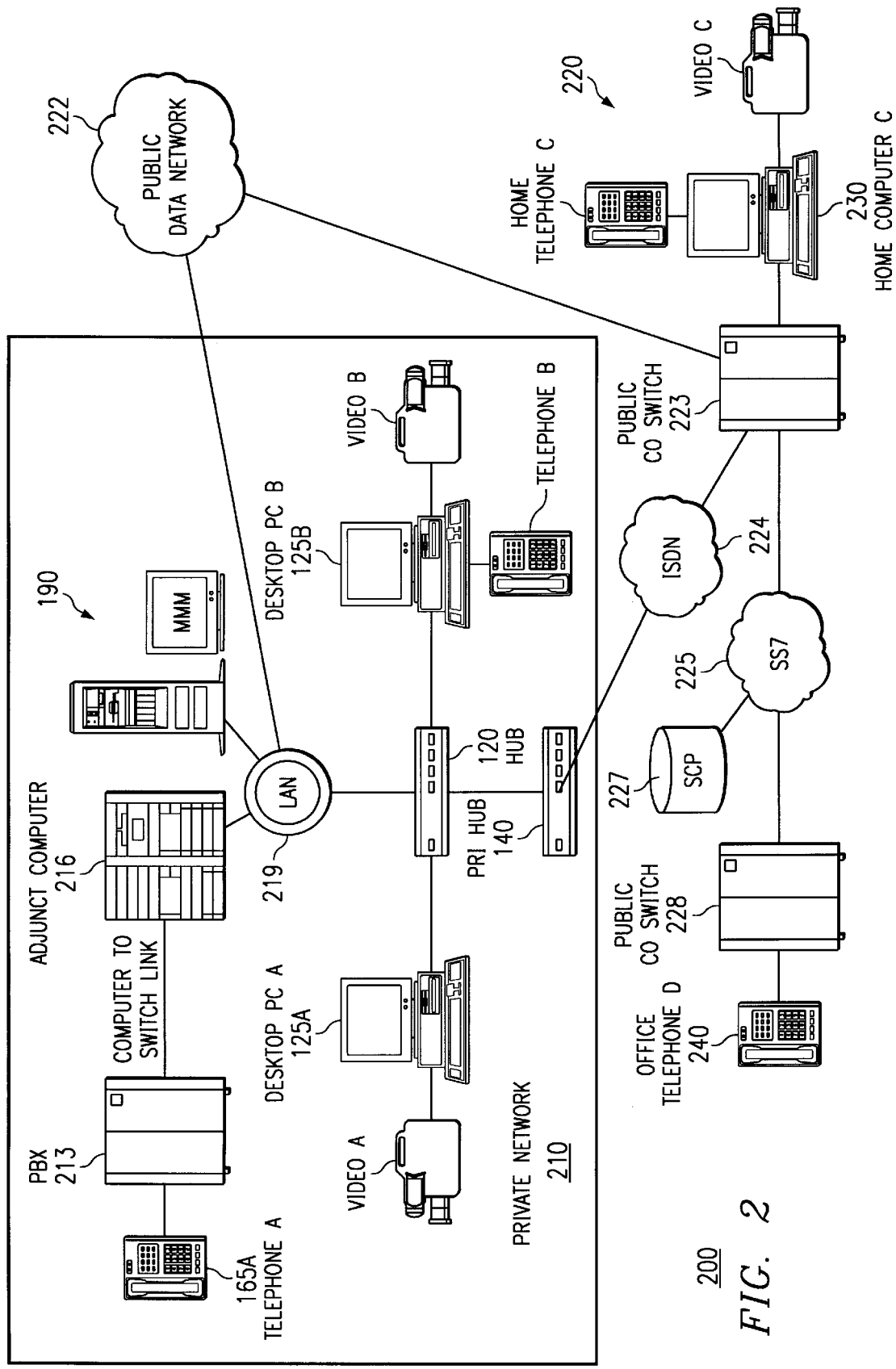
FIG. 2 illustrates a system diagram of a global isochronous network providing an environment within which the present invention operates.

Turning now to FIG. 2, illustrated is a system diagram of a global isochronous network 200 providing an environment within which the present invention operates. The global isochronous network 200 comprises a private network 210 (that may consist of any number of physical private network partitions), a public network 220, a home workstation 230 and an office telephone system 240. The system of the present invention comprises a design that allows an isochronous client device in a client-server-client architecture environment to control another isochronous client's operation directly through signalling. The client-server-client architecture environment and its advantages are described in U.S. Pat. No. 5,838,683, filed on Mar. 13, 1995, entitled "Distributed Interactive Multimedia System Architecture," commonly assigned with the present invention and previously incorporated herein by reference.

The private network 210 comprises a POT A 165A coupled through a PBX 213 and a adjunct computer 216 to a private network LAN 219. The private network 210 further comprises a desktop A 125A and a desktop B 125B (both subordinate devices with respect to the private network 210) coupled through an multimedia hub 120 to the private network LAN 219. A PRI hub 140 is coupled to the private network LAN 219, through the multimedia hub 120 and to the public network 220. A multimedia manager 190 is also coupled to the private network LAN 219. The private network LAN 219 is coupled to the public network 220 at a public data network 222 and an ISDN network 224, through the multimedia hub 120 and the PRI hub 140. The novel components of the private network 210 and their respective functions are described with respect to FIG. 1.

The public network 220 comprises the public data network 222, the ISDN network 224, a Signalling System 7 ("SS7") network 227 [coupled to a signal control point database ("SCP") 227] and first and second public central office ("CO") switches 223, 228. The public data network 222 comprises a data carrying network in the public network 220. The public data network 222 may employ a packet switching technology under the ITU-T X.25 packet switching protocol, although other data networks (most notably, the Internet) are fully within the scope of the invention. The public CO switches 223, 228 provide a switching matrix in the public network 220 for multiple subscriber lines. The ISDN network 224 provides ISDN connectivity in the public network 224. The SS7 network 225, with the SCP database 227, provides for signalling system seven signalling and its corresponding functionality in the public network 220.

The home workstation 230 and the office telephone system 240 are coupled to the first and second CO switches 223, 228, respectively, as a part of the global isochronous network 200. The home work station comprises an interactive multimedia desktop 125; the office telephone system 240 comprises a POT 165.

In FIG. 2, the desktop A 125A represents the controlling client in the global isochronous network 200. The desktop A 125A is illustrated as being a fully interactive multimedia PC. Both isochronous and packet data channels are available to the private network 210. The multimedia hub 120, connected to the desktop A 125A, provides a physical interface from which signaling can occur to control various components in the overall system. Desktop A 125A can control the isochronous devices in the global isochronous network including, the POT A 165A, the desktop B 125B, the home workstation C 230 and the office telephone system 240.

A video source, displayed in the desktop subsystem, includes, but is not limited to, a camera, a VCR or any other video device capable of transmitting or receiving a video signal over the isochronous channels. The desktops are multimedia devices capable of generating audio, video, text, graphics and binary data over isochronous channels. The telephones include analog, ISDN, private and public devices that are capable of originating any combination of voice, data and video calls in the isochronous network.

As previously mentioned, the system of the present invention provides a method that allows a client isochronous device in a client-server-client environment to control another isochronous client's behavior directly through signalling in various network configurations. In this scenario, the controlling client can affect the presentation to its user (through the controller user interface) and the user of the client it is controlling (through the controlled user interface).

This combination of signaling, and the availability of isochronous bandwidth on demand, allow new multimedia services to be implemented without involvement of centralized call and feature processors. To accomplish this, the hub must provide a signalling mechanism which enables the bridging of D channel packets onto the LAN and subsequently onto the public data network. The bridging function is the subject of U.S. Pat. No. 5,594,732, filed on Mar. 3, 1995, entitled "Bridging and Out-of Band Signalling Subsystems and Methods for a Multimedia System," commonly assigned with the present invention and previously incorporated herein by reference. The client applications must also engage in a cooperative procedure to exchange capabilities in order to export control from the controlled client to the controlling client.

It should be understood, however, that D channel bridging is not required for operation of the present invention, but is useful in that the desktops may behave as described when their associated network interface cards are set to isochronous-only mode.

Figure 3:
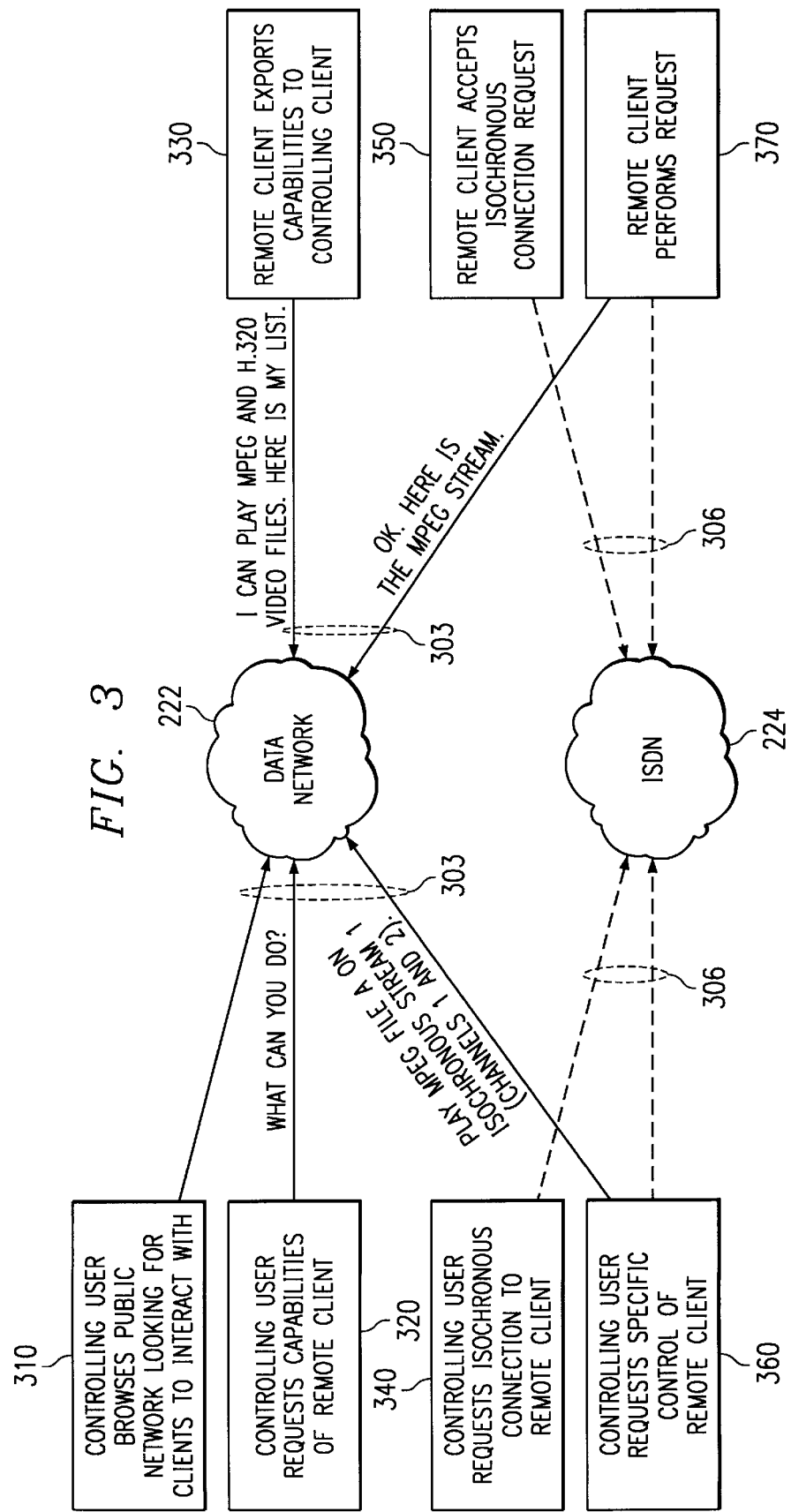
FIG. 3 illustrates a block diagram of a signalling and circuit connection procedure allowing remote control of an isochronous device.

Turning now to FIG. 3, illustrated is a block diagram of a signalling and circuit connection procedure allowing remote control of an isochronous device. Signalling paths 303 traverse between a client and controlling devices through the public data network 222, and the circuit connections traverse between the client and controlling device to the ISDN network 224.

The method of remotely controlling an isochronous device commences at a browse step 310, wherein a user, in cooperation with a graphical user interface (not required), browses the network looking for a client (a "remote client") with which to interact. Browsing may not be required, as the user may know specifically which client it wishes to control by some other means. When a remote client is located, the controlling client requests the remote client's capabilities in a request step 320. If the remote client responds to the request with capabilities (in an export step 330) that are of interest to the controlling client, the controlling client requests an isochronous user information path (or, synonymously, a "circuit connection") in a request connection step 340. The remote client responds by accepting the isochronous circuit connection in a acceptance step 350. In a control step 360, the controlling client requests specific control of the remote client (now a "controlled client"). The controlled client responds by performing on the request made by the controlling client in a perform step 370. In the illustration, the controlled client exports the capability to play a variety of video-formatted files on the isochronous streams.

The above-described method of the present invention yields a significant advantage when employed in an environment such as the Internet. As those who frequent the Internet are well aware, Internet bandwidth is severely limited in the best of circumstances. Transferring the sheer quantities data associated with video across the Internet, as it presently exists, is time consuming and renders the transmission of high quality, real-time video impossible. The present invention allows the user to employ the connectivity of the Internet to browse for remote video sources and, when a suitable remote source is located, the user can open a point-to-point isochronous user information path of guaranteed bandwidth and characteristics between the user's controlling client and the controlled client containing the video source for transmission of the video source to the user in real time and outside the Internet.

From the above description, it is apparent that this aspect of the present invention provides a system for allowing remote control of an isochronous device, comprising: (1) first and second isochronous devices, (2) a packet-based signalling channel coupling the first and second isochronous devices and allowing communication of signalling messages between the first and second isochronous devices, the first isochronous device capable of initiating a request to the second isochronous device to transfer multimedia information from the second isochronous device to the first isochronous device and (3) an isochronous user information path established by the second isochronous device in response to initiation of the request, the isochronous user information path coupling the first and second isochronous devices for transfer of the multimedia information, the first isochronous device thereby effecting remote control of the second isochronous device.

Figure 4:
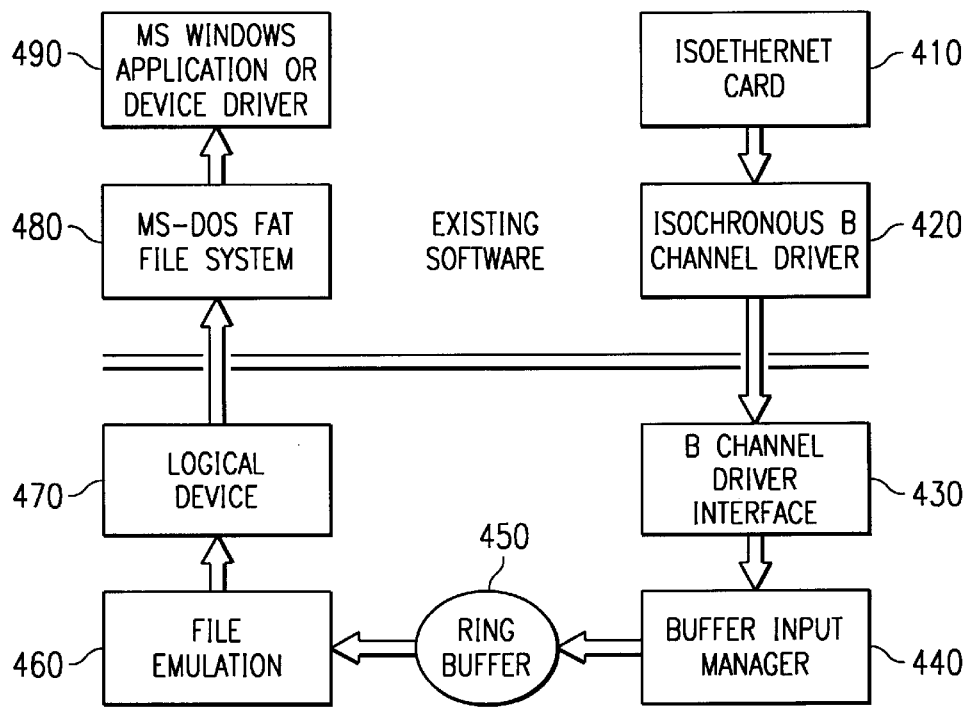
FIG. 4 illustrates a block diagram of a software-based system for receiving a video stream from an isochronous channel and playing the video stream on a conventional desktop video player.

Turning now to FIG. 4, illustrated is a block diagram of a software-based system for receiving a video stream from an isochronous channel and playing the video stream on a conventional desktop video player. The system of the present invention describes a software design that abstracts an isochronous data stream from a user information path to a logical block device and file. As illustrated, the isochronous data stream is read from B channels coupled to an isoEthernet® interface card 410. Again, the illustrated embodiment encompasses a requirement to transmit pre-encoded Motion Picture Experts Group ("MPEG") video and audio data from a video server PC onto a set of isochronous B channels. This data must be transmitted at a rate determined by information in the data itself. One or more PCs may receive this data stream, thereby allowing multicasting.

The isochronous data from the isoEthernet® card 410 is delivered to the software-based system of the present invention by an isochronous B channel driver 420. A B channel driver interface 430 receives the isochronous stream data, parses the data stream and breaks the data into MPEG packets, which are passed to a buffer input manager 440. The buffer input manager 440 fills a ring buffer 450 with the MPEG packets without regard to file sector boundaries. If the ring buffer becomes full, MPEG packets are discarded to keep the MPEG decoder in synchronization with the incoming MPEG data.

On the exit side of the ring buffer 450, the software-based system of the present invention implements a logical drive and file compatible with a Microsoft® Disk Operating System ("MS-DOS") File Allocation Table ("FAT") file system 480. The FAT file system 480 provides an index for the operating system. A Microsoft® Windows® operating system overlays the operating system.

A logical device 470 appears to the file system 480 as a one gigabyte drive. A file emulator or file emulation driver 460 emulates a one gigabyte file and, in the illustrated embodiment, is a virtual device driver ("VXD") designed to function in cooperation with Microsoft® Windows®. The current maximum drive/file size for the FAT file system is four gigabytes. The maximum allowed file size accommodates approximately six to eight hours of MPEG playing time. The one gigabyte file provided by the file emulation driver 460 therefore provides about two hours of MPEG encoded video. The file emulation driver 460 range-checks the input file sectors from the operating system and either emulates the FAT table and directory or reads data from the ring buffer 450. As the data sector number increases past the end of the buffer 450, the ring buffer 450 wraps back to the beginning. If the buffer becomes empty, padding is inserted to satisfy the MPEG decoder timing requirements.

While the operating system of choice is MS-DOS and Windows® and the application is an MPEG file viewing application, the software-based system of the present invention is adapted to execute on other operating systems and under other applications, such as on a Macintosh® computer executing a System 7 operating system.

Figures 5A, 5B:
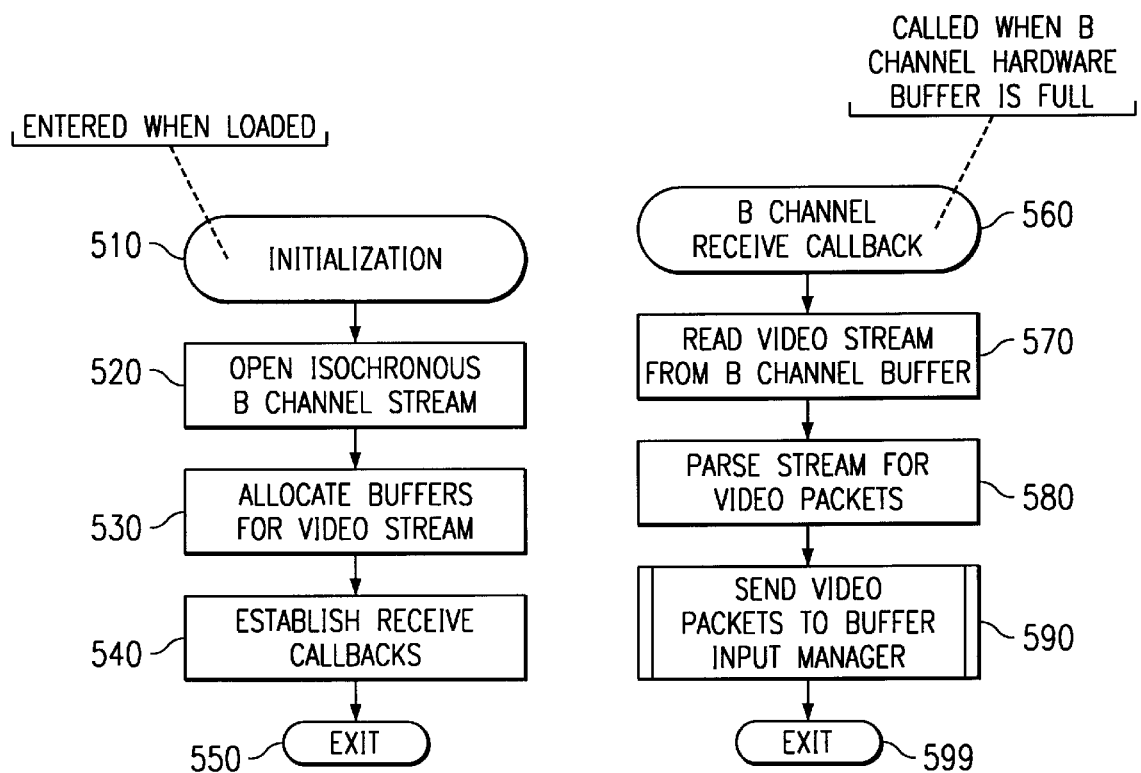
FIG. 5 illustrates a flow diagram of a B channel driver interface that forms a portion of the software-based system of FIG. 4.

Turning now to FIG. 5, illustrated is a flow diagram of a B channel driver interface 420 that forms a portion of the software-based system of FIG. 4. When the operating system boots, the B channel driver interface 420 initializes in an initialization step 510. Next, the B channel driver interface 420 opens an isochronous B channel stream in an open channel step 520. In an allocation step 530, a buffer is allocated for a video stream. In an establishment step 550, the B channel driver interface 420 establishes a receive callback. Initialization of the B channel driver interface 420 is completed in an exit initialization step 550.

At some point later during the operation of the software-based system of the present invention, the B channel driver interface 420 receives a callback in a callback step 560. The callback request advises the B channel interface 420 that a B channel buffer is full. In response, the B channel driver interface 420 reads the video stream from the B channel buffer in a read step 570. In a parse step 580, the B channel driver interface 420 parses the video stream into video packets. Then, the B channel driver interface 420 sends the video packets to the buffer input manager 440 during a transmit step 590. Finally, the B channel driver interface 420 terminates at a B channel driver interface exit step 599.

Turning now to FIG. 6, illustrated is a flow diagram of a buffer input manager 440 that forms a further portion of the software-based system of FIG. 4. First, the buffer input manager 440 writes the video packets to the ring buffer 450 in a write video packet step 610. The buffer input manager 440 determines whether the ring buffer 450 is full in a buffer full decisional step 620.

If the ring buffer 450 is not full, then, in a write packet step 630, the buffer input manager 440 writes a packet to the ring buffer 450. However, if the ring buffer 450 is full, then the buffer input manger 440 discards the packet in a discard step 640 and the buffer input manager 440 proceeds to a more packets decisional step 670.

After a packet is sent to the ring buffer 450 in the write packet step 630, the process determines if the ring buffer 450 is at the end in a ring buffer end decisional step 650. If the ring buffer 450 is at the end, a write pointer is wrapped around to the beginning of the ring buffer 450 in a wrap step 660. If the ring buffer 450 is not at the end, the buffer input manager 440 proceeds to the more packets decisional step 670. Returning to the wrap step 660, after the pointer is wrapped in the ring buffer, the buffer input manager 440 proceeds to the more packets decisional step 670.

At the more packets decisional step 670, the buffer input manager 440 determines if there are more packets to write. If there are more packets, then the buffer input manager 440 returns to the buffer full decisional step 620, otherwise the procedure terminates at a buffer input manager step 680.

Figure 7C:
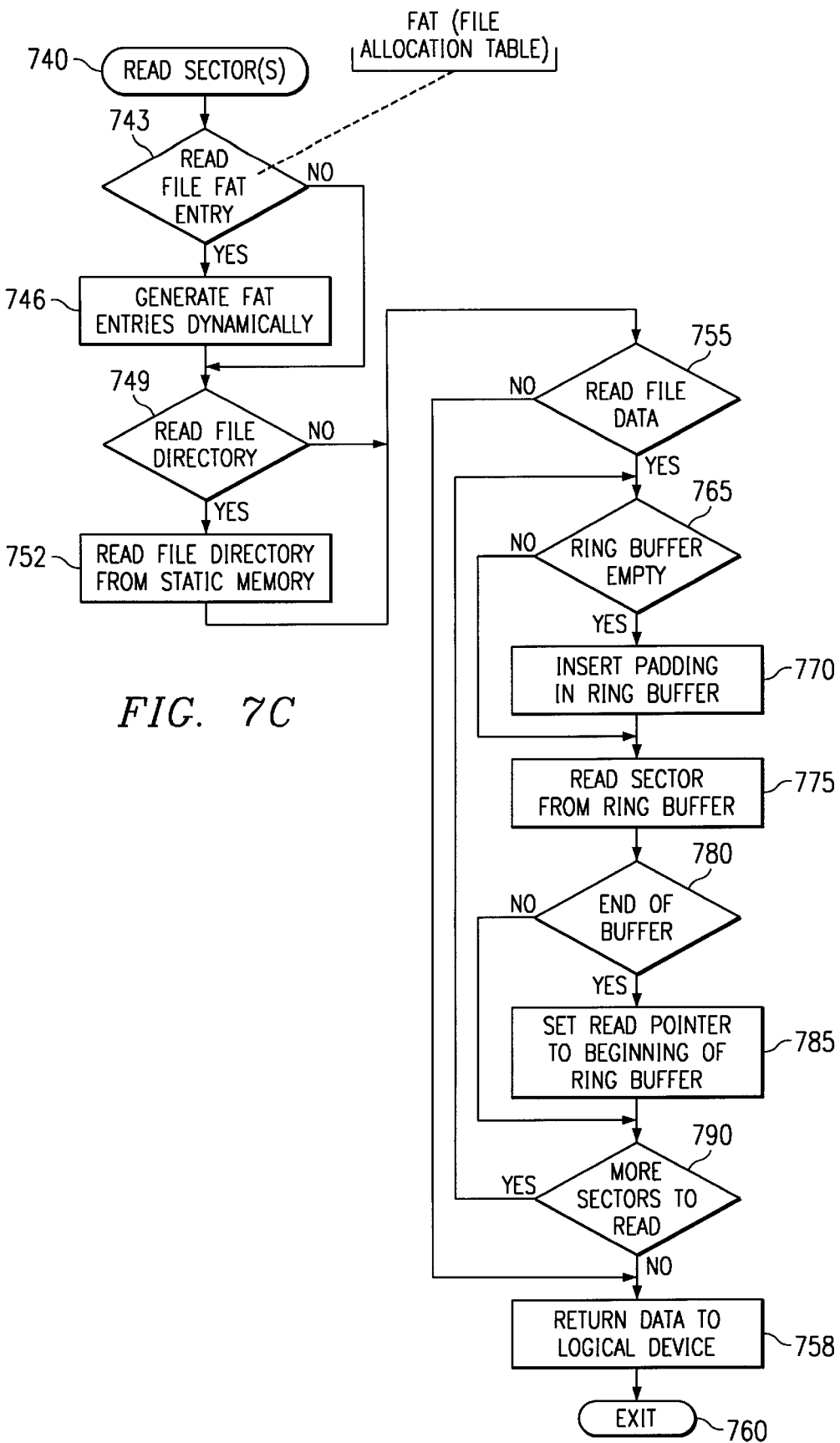
FIG. 7 illustrates a flow diagram of a file emulation virtual device driver that forms yet a further portion of the software-based system of FIG. 4.

Turning now to FIG. 7, illustrated is a flow diagram of a file emulation virtual device driver 460 that forms yet a further portion of the software-based system of FIG. 4. When the operating system boots, the file emulation driver 460 initializes in a module initialization step 705. Next, the file emulation driver 460 allocates memory for the ring buffer 450 in a memory step 710. In a create static memory step 715, a file directory is created in a static memory of the logical device 470. In a set pointer step 720, the file emulation driver 460 sets a read and write pointer in the ring buffer 450 to the beginning thereof. Initialization of the file emulation driver 460 is complete at an exit file emulation driver initialization step 725.

At some point later during the operation of the software-based system of the present invention, a Basic Input/Output System ("BIOS") parameter block ("BPB"), containing information regarding the logical device (an emulated disk drive), is created beginning at a build BPB step 730. In a get hard-coded step 733, a fixed, static BPB is retrieved; then, in a return step 736, the BPB is returned to the logical device 470. The build BPB phase of the file emulation driver 460 procedure terminates at a build the BPB step 739.

The procedure for the file emulation driver 460 continues with a read sector step 740, wherein the file emulation driver 460 reads sectors from the ring buffer 450. In a read file FAT decisional step 743, the file emulation driver 460 determines if it should read a file FAT entry by checking the range of sectors to read. If the file emulation driver 460 should read a file FAT entry, then the file emulation driver 460 proceeds to a generate FAT entry step 746 to generate a FAT dynamically, otherwise, the file emulation driver 460 continues to a read file directory decisional step 749. In the read file directory decisional step 749, the file emulation driver 460 determines whether it should read a file directory. If the file emulation driver 460 should read a file directory, then the file emulation driver 460 proceeds to a read file directory step 752 and a file directory is read from the static memory, otherwise, the file emulation driver 460 continues to a read file data decisional step 755.

In the read file data decisional step 755, the file emulation driver 460 determines if data can be read from the ring buffer 450. If the data cannot be read, then the file emulation driver 460 proceeds to a return data to the logical device step 758 and then terminates the file emulation driver 460 at a file emulation driver exit step 760.

If data can be read from the ring buffer 450, then the data emulation driver 460 determines if the ring buffer is empty in a ring buffer empty decisional step 765. If the ring buffer 450 is empty, a padding is inserted in an insert padding step 770. Once the padding is inserted, a sector is read from the ring buffer 450 in a read sector from ring buffer step 775. If the ring buffer 450 is not empty, then a sector is read from the ring buffer 450 in the read sector from ring buffer step 775.

Next, at an end of buffer decisional step 780, the file emulation driver 460 determines if the buffer is ended. If the buffer is ended, a read pointer in the ring buffer 450 is set at a set pointer step 785, otherwise proceed directly to a more sectors to read decisional step 790. If there are more sectors to read, then the file emulation driver 460 proceeds to the ring buffer empty decisional step 765, otherwise the file emulation driver 460 proceeds to the logical device step 758 and then terminates the file emulation driver 460 at the file emulation drive exit step 760.

Figure 8:
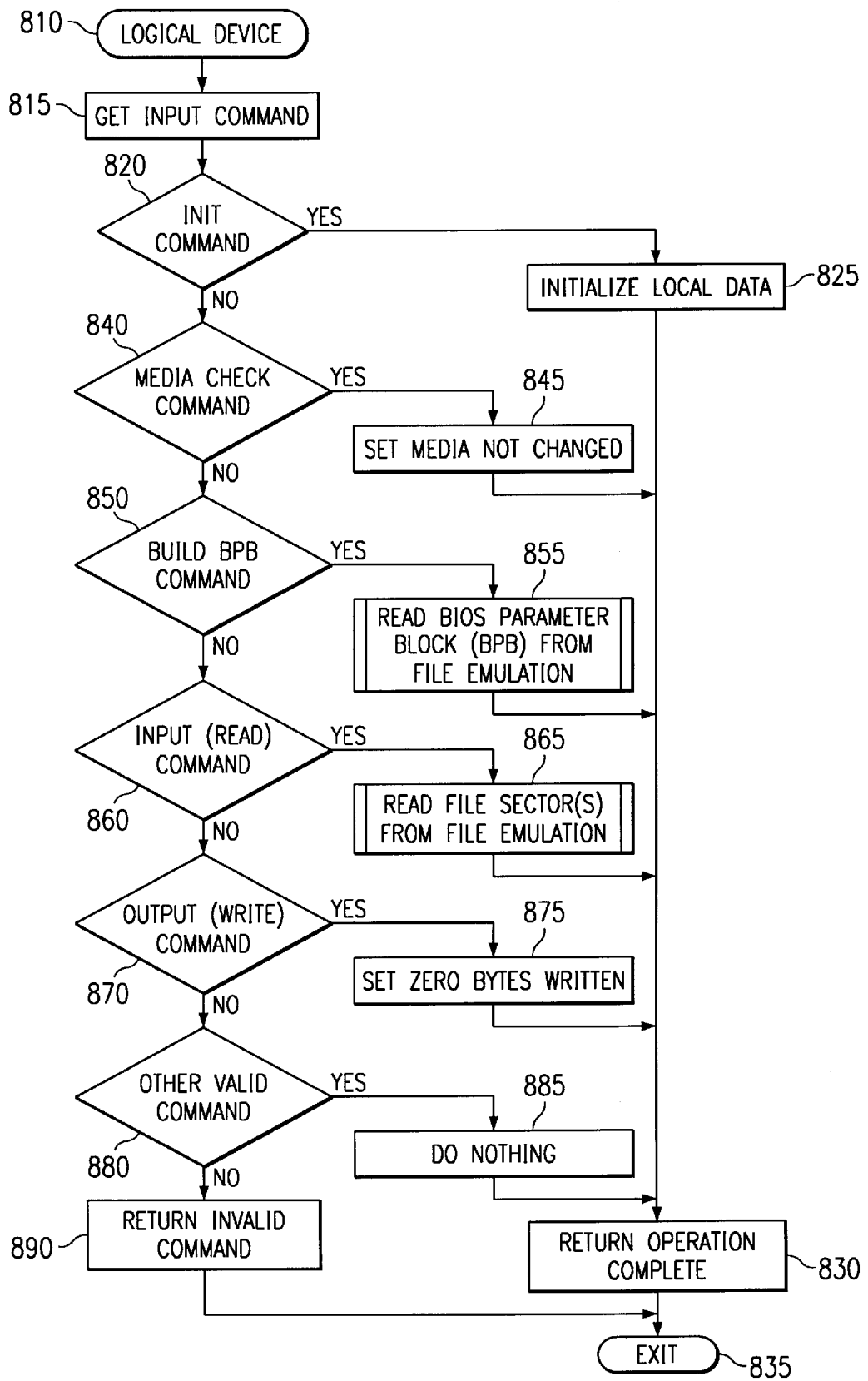
FIG. 8 illustrates a flow diagram of a logical device that forms still a further portion of the software-based system of FIG. 4.

Turning now to FIG. 8, illustrated is a flow diagram of the logical device 470 that forms still a further portion of the software-based system of FIG. 4. The logical device 470 procedure commences at a logical device begin step 810. Then the logical device 470 receives an input command from the operating system at a command step 815.

At an initialize command decisional step 820, the logical device 470 determines if it has received an initialize command. If the logical device 470 has, then the logical device 470 initializes the local data at an initialize the local data step 825. After the initialize the local data step 825, the logical device 470 progresses to a return operation complete step 830 and then terminates at a logical device drive exit step 835. If the logical device 470 has not received an initialize command, then the logical device 470 proceeds to a media check command decisional step 840.

At the media check command decisional step 840, the logical device 470 determines if it has received a media check command. If the logical device 470 has, then the logical device 470 sets the media to "no change" at a set media step 845. After the set media step 845, the logical device 470 progresses to the return operation complete step 830 and then terminates at the logical device drive exit step 835. If the logical device 470 has not received a media check command, then the logical device 470 proceeds to a build BPB command decisional step 850.

At the build BPB command decisional step 850, the logical device 470 determines if it has received a build BPB command. If the logical device 470 has, then the logical device 470 reads the BPB at a read a BPB step 855. After the read a BPB step 855, the logical device 470 progresses to the return operation complete step 830 and then terminates at the logical device drive exit step 835. If the logical device 470 has not received a build BPB command, then the logical device 470 proceeds to an input command decisional step 860.

At the input command decisional step 860, the logical device 470 determines if it has received an input command. If the logical device 470 has, then the logical device 470 reads file sectors from the file emulation driver 460 at a read file sector step 865. After the read file sector step 865, the logical device 470 progresses to the return operation complete step 830 and then terminates at the logical device drive exit step 835. If the logical device 470 has not received an input command, then the logical device 470 proceeds to a output command decisional step 870.

At the output command decisional step 870, the logical device 470 determines if it has received an output command. If the logical device 470 receives the output command, then the logical device 470 returns a zero bytes written at a set zero step 875. After the set zero step 875, the logical device 470 progresses to the return operation complete step 830 and then terminates at the logical device drive exit step 835. If the logical device 470 does not receive an output command, then the logical device 470 proceeds to an other valid command decisional step 880.

At the other valid command decisional step 880, the logical device 470 determines if it has received another valid command. If the logical device 470 receives a valid command, then the logical device 470 does nothing at a do nothing step 885. After the do nothing step 885, the logical device 470 progresses to the return operation complete step 830 and then terminates at the logical device drive exit step 835. If the logical device 470 does not receive a valid command, then the logical device 470 proceeds to a return invalid command step 890 and then terminates at the logical device drive exit step 835.

From the above description, it is apparent that this aspect of the present invention provides, in a computer having an operating system, a video file viewing application executing within the operating system and circuitry coupling the computer to an isochronous user information path, a system for adapting a data stream received into the circuitry from the isochronous user information path for use by the video file viewing application. The system comprises: (1) a buffer, under control of a buffer input manager, the buffer capable of receiving and storing portions of the data stream from the isochronous information path via the buffer input manager and (2) a file emulator capable of extracting the portions of the data stream from the buffer and presenting the portions as though having been retrieved from a file compatible with the operating system, the file emulator thereby enabling the video file viewing application to retrieve the portions from the file emulator and display the portions on an output device associated with the computer.

Although the present invention and its advantages have been described in detail, those skilled in the art should understand that they can make various changes, substitutions and alterations herein without departing from the spirit and scope of the invention in its broadest form.

What is claimed is:

1. In a computer having an operating system, a video file viewing application executing within said operating system and circuitry coupling said computer to an isochronous user information path, a system for adapting a data stream received into said circuitry from said isochronous user information path for use by said video file viewing application, comprising:

a buffer, under control of a buffer input manager, said buffer capable of receiving and storing portions of said data stream from said isochronous information path via said buffer input manager; and a file emulator capable of extracting said portions of said data stream from said buffer and presenting said portions as though having been retrieved from a file compatible with said operating system, said file emulator thereby enabling said video file viewing application to retrieve said portions from said file emulator and display said portions on an output device associated with said computer.

2. The system as recited in claim 1 wherein said data stream is a real time audio data stream.

3. The system as recited in claim 1 wherein said isochronous user information path is carried on an Integrated Services Digital Network (ISDN) B channel.

4. The system as recited in claim 1 wherein said circuitry coupling said computer system to said isochronous user information path comprises an isochronous Integrated Services Digital Network (ISDN) B channel driver.

5. The system as recited in claim 1 further comprising an Integrated Services Digital Network (ISDN) B channel driver interface coupling said circuitry and said buffer input manager.

6. The system as recited in claim 1 wherein said buffer is a ring buffer.

7. The system as recited in claim 1 wherein said file emulator comprises a virtual device driver.

8. The system as recited in claim 1 further comprising a logical device enabling said video file viewing application to retrieve said portions from said file emulator.

9. The system as recited in claim 1 wherein said operating system comprises Microsoft® Window® overlaying Miscrsoft® MS-DOS.

10. The system as recited in claim 1 wherein said computer is a personal computer (PC).

11. In a computer having an operating system, a video file viewing application executing within said operating system and circuitry coupling said computer to an isochronous user information path, a method for adapting a data stream received into said circuitry from said isochronous user information path for use by said video file viewing application, comprising the steps of:

receiving and storing portions of said data stream from said isochronous information path in a buffer under control of a buffer input manager;

extracting said portions of said data stream from said buffer with a file emulator; and presenting, with said file emulator, said portions as though having been retrieved from a file compatible with said operating system, said file emulator thereby enabling said video file viewing application to retrieve said portions from said file emulator and display said portions on an output device associated with said computer.

12. The method as recited in claim 11 wherein said data stream is a real time audio data stream.

13. The method as recited in claim 11 further comprising the step of carrying said isochronous user information path on an Integrated Services Digital Network (ISDN) B channel.

14. The method as recited in claim 11 wherein said circuitry coupling said computer system to said isochronous user information path comprises an isochronous Integrated Services Digital Network (ISDN) B channel driver.

15. The method as recited in claim 11 further comprising the step of coupling an Integrated Services Digital Network (ISDN) B channel driver interface between said circuitry and said buffer input manager.

16. The method as recited in claim 11 further comprising the step of storing said portions in a ring buffer.

17. The method as recited in claim 11 wherein said file emulator comprises a virtual device driver.

18. The method as recited in claim 11 further comprising the step of enabling said video file viewing application to retrieve said portions from said file emulator with a logical device.

19. The method as recited in claim 11 wherein said operating system comprises Microsoft® Windows® overlaying Microsoft® MS-DOS.

20. The method as recited in claim 11 wherein said computer is a personal computer (PC).

21. The system as recited in claim 1 wherein said data stream is a real time video data stream.

22. The system as recited in claim 1 wherein said operating system comprises Microsoft® Windows®.

23. The method as recited in claim 11 wherein said data stream is a real time video data stream.

24. The method as recited in claim 11 wherein said operating system comprises Microsoft® Windows®.

* * * * *